Feb. 12, 1935.  E. SCHIMANEK  1,991,296
METHOD FOR THE AUTOMATIC CONTROL OF AVIATION ENGINES
Filed Nov. 11, 1932
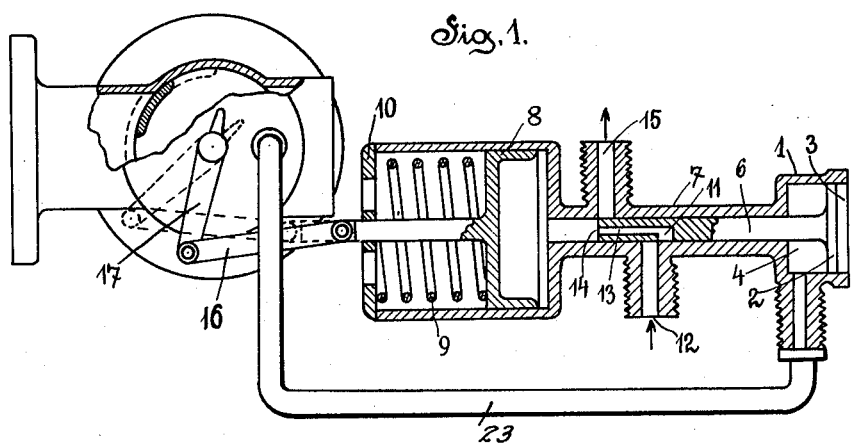
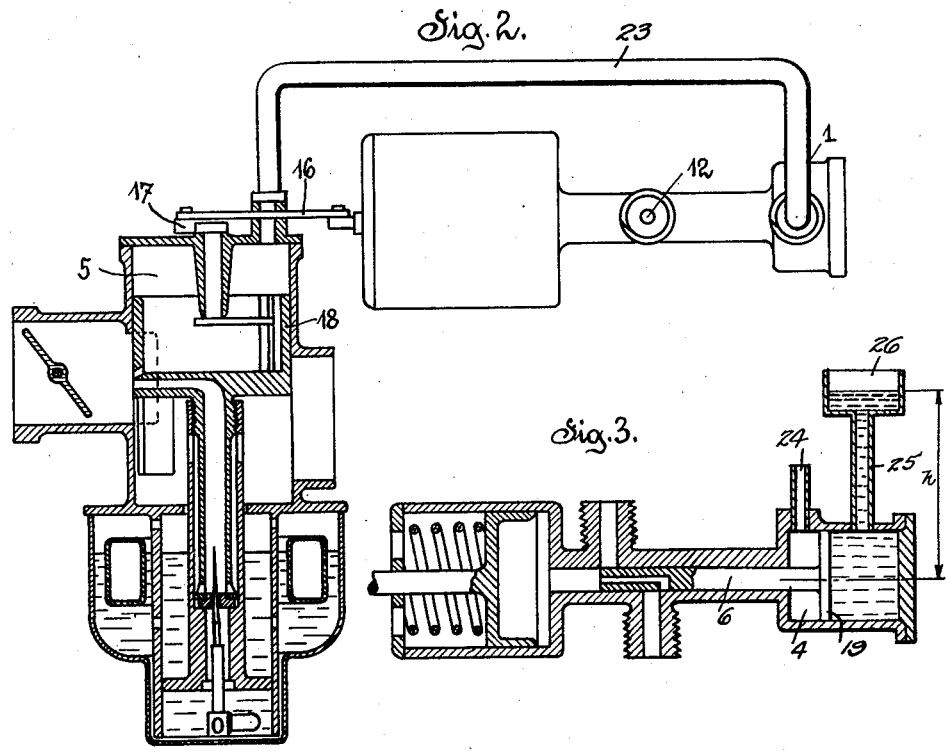
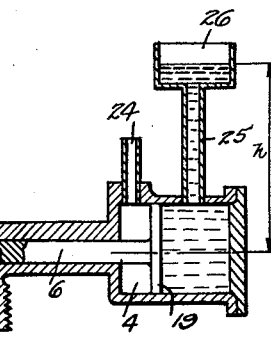
E. Schimanek
INVENTOR Patented Feb. 12, 1935

1,991,296

UNITED STATES PATENT OFFICE 1,991,296

METHOD FOR THE AUTOMATIC CONTROL OF AVIATION ENGINES

Emil Schimanek, Budapest, Hungary, assignor to Societe Du Carburateur Bleriot, Paris, France Application November 11, 1932, Serial No. 642,315
In France July 2, 1932

6 Claims. (Cl. 137—153)

It is known that the power of aviation engines varies with the flight altitude, the barometric pressure and the temperature, and therefore with the specific weight of the air. This variation in specific weight manifests itself in two ways:
1. By altering the supply to the cylinder;
2. By altering the mixture at the carburettor.
It is known that this first alteration is remedied either by employing a compressor or by employing a larger cylinder in combination in both cases with the necessary throttling of the induction pipe.

With regard to the second alteration or change, it is known that, in order to prevent this, the carburettor setting is altered.

The subject of the present invention is a method permitting such adjustments to be made by an automatic control, that is to say both the throttle adjustments and the carburettor setting (correction).

The mehod consists essentially in the use of a vacuum for actuating a servo-motor producing the adjustments mentioned above the vacuous condition being provided by the carburettor of the type, for instance, as that described in German Patent No. 422,479.

The vacuum mentioned above is utilized for maintaining an auxiliary liquid under a constant pressure, which pressure is always balanced by the external atmospheric pressure and by the additional use of a spring, diaphragm or similar member.

The variation in atmospheric pressure produces a movement of the member which had hitherto been kept in equilibrium in particular by this atmospheric pressure but after a certain movement the deformation of the spring or of the similar members arrest this movement by re-establishing the equilibrium. These movements and these deformations which may be uniformly regulated by calibrating the spring may thus be employed for controlling a correcting member.

In the two cases mentioned at the commencement of the description, that is to say, when regulating the supply to the cylinders or when regulating the mixture at the carburettor, the regulating member (throttle valve etc.) is actuated by the member put into movement.

The following description given by way of example with reference to the accompanying drawing will enable the manner in which the invention can be carried out to be clearly understood.

Figure 1 is a plan view with a part removed and a part in section showing an improved carburettor according to the present invention;

Figure 2 is an elevation of the carburettor showing an axial section;

Figure 3 shows a modified form of construction of the corrector indicated in Figure 1.

The automatic altimetric corrector fitted for example to a carburettor such as the one described in French Patent No. 611,742 in the chamber 5 of which there is a constant pressure which is below atmospheric pressure is formed by a cylinder 1 in which moves a piston 2. Atmospheric pressure exists at the outer side of the piston.

On the other side of the piston in the chamber 4 there exists the pressure of the chamber 5 that is to say a pressure which is lower than atmospheric and which is constant. The rod 6 of the piston 2 moves in the body 7 and acts as a controlling member for a servo-motor with respect to the atmospheric pressure because the weight of the piston 18 of the carburettor is kept in balance by this low pressure.

The servo-motor is formed by the piston 8 mounted in the body 7. This piston is loaded by the spring 9. The pressure of the spring may be varied by rotating the cap 10 which is connected to the body 7 by a screw thread, not shown.

If, by moving towards the left, the hole 11 of the regulating piston 6 becomes situated in front of the aperture 12, oil under pressure can act upon the piston 8 by passing through the hole 12, the aperture 11 and the channel 13. Further, if during this movement towards the right the terminal edge 14 of the piston 2 uncovers the aperture 15 of the channel. The oil which is in contact with the piston will flow through this aperture.

The movement of the piston 8 is transmitted by the rod 16 to the lever 17 which in its turn makes the piston 18 of the carburettor turn.

The operation of the servo-motor is as follows. On account of the constant difference in pressure that exists between the chamber 3 and the chamber 4, the piston 2 is pushed with a constant force towards the left. This force, divided by the section of the piston rod 6, gives the constant oil pressure that will be produced behind the piston 8. The difference between the total oil pressure and the external atmospheric pressure on the piston 8 is borne by the spring 9.

If the aeroplane now rises the atmospheric pressure falls; the difference between the external atmospheric pressure on the one hand and the unchanged oil pressure existing behind the piston 8 on the other hand is therefore equal to the difference between the atmospheric pressures at the altitude in question, and on the ground.

The oil pressure pushes the piston 8 towards the left, that is to say towards the outside. Consequently the spring 9 is further compressed. It is calibrated in such a way that, for a given atmospheric pressure for example 0.5 atmospheres, it becomes compressed by an amount corresponding exactly to the amount the piston 8 must move towards the left in order to give the piston 18 an angular position which gives a perfect adjustment for the atmospheric pressure in question. The piston 8 is connected to the piston 18 by means of the rod 16 and the lever 17.

The constant oil pressure behind the piston 8 is obtained by the fact that a by-pass of the oil circulation of the engine is mounted on the union 12. If the pressure per unit area behind the piston 8 is less than the pressure which the piston 2 imparts to the rod 6, a force directed towards the left is produced and the piston 2 moves towards the left until the hole 11 has reached the aperture 12. The oil at higher pressure then enters through the connection 12 until the pressure produced overcomes the force acting towards the left on the piston 2, and moves the latter towards the right, thus separating the orifice 11 from the aperture 12. The admission of oil is then cut off.

On the other hand, if the oil pressure behind the piston 8 is too great, it causes the piston 2 to move towards the right. The edge 14 of the piston rod 6 then opens the outlet 12 and the oil pressure falls.

It is thus seen that this to and fro movement produces a constant oil pressure behind the piston 8.

The constant force urging the piston 6 to the left is obtained in the constructional form illustrated in Figures 1 and 2 by securing to the rod 6 a piston 2, movable in a cylinder 1. The outer or right-hand face 3 of the piston 2 is open to the atmosphere, and the closed cylinder space 4 to the left of the piston 2 communicates by piping 23, with a carburettor chamber 5, in which there is a constant partial vacuum, that is to say, a pressure which is below the pressure of the surrounding atmosphere by a constant amount. This chamber forms the upper end of a vertical cylinder, and is closed at the bottom by a piston 18, vertically movable in the cylinder. The cylinder space below the piston 18 is open to the atmosphere, and the weight of the piston is balanced by the difference in pressure between the air above it and the air below it. Since the weight of the piston does not alter, the pressure difference remains constant. Consequently the difference between the air pressure on the two sides of the piston 2 is also constant, thereby providing a constant force urging the rod 6 to the left.

Figure 3 illustrates a different method of obtaining this constant thrust. Here the rod 6 terminates in a piston 19, corresponding to the piston 2 of Figure 1, but working in a cylinder closed at both ends. The left-hand cylinder space 4 is open to the atmosphere at 24, but the right-hand end is filled with liquid and communicates with a vertical tube 25, terminating at the top in a small open reservoir 26. The mean absolute pressure of the liquid against the piston 19 is determined by its head $h$ plus the atmospheric pressure acting upon the free surface of the liquid in the reservoir 26; but since atmospheric pressure also acts through the tube 24 on the other side of the piston 19 the net force acting to the left is equal to the hydrostatic pressure resulting from the head $h$. The reservoir 26 serves to keep the head $h$ substantially constant notwithstanding movements of the piston 19. This form of construction could of course only be used on aircraft e. g. airships flying mainly in a substantially horizontal position.

The constant force urging the rod 6 to the left may alternatively be obtained by other means, for instance by connecting with the right-hand or left-hand side of the piston 2 or 19 any other raised or lowered fluid pressure either normally available or expressly provided for the purpose and differing from the pressure of the surrounding atmosphere by a constant amount.

In the case when the supply to the cylinders has to be regulated and not the mixture to the carburettor, the regulating member may naturally be connected to the controlling throttle valve.

What I claim is:

1. An apparatus for controlling the power output of aircraft engines in dependence on atmospheric pressure comprising a regulating member, a controlling member, a chamber between said members, a fluid under pressure in said chamber and acting on both members to urge the latter in one direction, the regulating member being acted on and urged in the opposite direction by atmospheric pressure, a constant force acting on the controlling member urging the latter in the opposite direction, said controlling member controlling the admission and discharge of the pressure fluid to said chamber, said controlling member operating when the pressure of said fluid falls to admit more pressure fluid to said chamber and operating when the pressure of the fluid increases to discharge the latter, said controlling member cutting off the admission and discharge of the pressure fluid when normal pressure of the latter is re-established.

2. An apparatus as claimed in claim 1 characterized by the provision of spring means resiliently acting on the regulating member to maintain the latter in equilibrium when it is displaced by a change in atmospheric pressure.

3. An apparatus as claimed in claim 1 characterized in that said constant force is constituted by a pressure having a value different from atmospheric pressure.

4. An apparatus as claimed in claim 1 characterized in that said constant force is constituted by the constant partial vacuum existing in the carburettor of the engine.

5. An apparatus as claimed in claim 1 characterized in that said constant force is constituted by a column of liquid.

6. An apparatus as claimed in claim 1 characterized in that said regulating and controlling members are constituted by pistons, the controlling piston being provided with a rod acting as a slide valve controlling the admission and discharge of the pressure fluid.

EMIL SCHIMANEK.